(12) United States Patent
Fujibayashi et al.

(10) Patent No.: US 8,224,478 B2
(45) Date of Patent: Jul. 17, 2012

(54) NUMERICAL CONTROLLER

(75) Inventors: Kentaro Fujibayashi, Musashino (JP);
Masahiko Hosokawa, Yamanashi (JP);
Shuji Ogawa, Yamanashi (JP);
Masahiko Miyake, Hachiouji (JP)

(73) Assignee: Fanuc Ltd, Yamanashi (JP)

( * ) Notice: Subject to any disclaimer, the term of this patent is extended or adjusted under 35 U.S.C. 154(b) by 1265 days.

(21) Appl. No.: 11/585,282

(22) Filed: Oct. 24, 2006

(65) Prior Publication Data
US 2007/0100493 A1 May 3, 2007

(30) Foreign Application Priority Data

Oct. 28, 2005 (JP) ................................. 2005-314478

(51) Int. Cl.
*G06F 19/00* (2006.01)
(52) U.S. Cl. ..................... 700/169; 700/170; 700/174
(58) Field of Classification Search .................. 700/169, 700/170, 172, 173, 174, 175; 318/569
See application file for complete search history.

(56) References Cited

U.S. PATENT DOCUMENTS

| | | | | | |
|---|---|---|---|---|---|
| 5,079,490 | A | * | 1/1992 | Kita et al. ...................... | 318/569 |
| 5,083,071 | A | * | 1/1992 | Sasaki et al. .................. | 318/569 |
| 5,181,178 | A | * | 1/1993 | Sasaki et al. .................. | 700/169 |
| 7,168,075 | B1 | | 1/2007 | Barthel et al. | |
| 2002/0003416 | A1 | * | 1/2002 | Sagasaki et al. ............. | 318/600 |
| 2002/0049512 | A1 | * | 4/2002 | Mizuno et al. ................ | 700/169 |
| 2004/0198574 | A1 | * | 10/2004 | Brakelmann et al. ............. | 483/1 |
| 2005/0240301 | A1 | * | 10/2005 | Endo et al. .................... | 700/179 |

FOREIGN PATENT DOCUMENTS

| | | |
|---|---|---|
| EP | 1 238 318 | 9/2002 |
| JP | 49-050385 | 5/1974 |
| JP | 03-071205 | 3/1991 |
| WO | WO00/39646 | 7/2000 |

OTHER PUBLICATIONS

European Search Report, mailed Feb. 19, 2007, and issued in corresponding European Patent Application No. 06255381.3-2206.
Notice of Reasons for Rejection mailed Dec. 18, 2007 for Japanese Application No. 2005-314478.
Notice of Reasons for Rejection mailed Oct. 9, 2007 in Japanese application 2005-314478.

* cited by examiner

*Primary Examiner* — Albert Decady
*Assistant Examiner* — Steven Garland
(74) *Attorney, Agent, or Firm* — Staas & Halsey LLP

(57) ABSTRACT

A numerical controller that shortens time required for transferring control of a spindle between control systems. When the spindle control command is included, the command is carried out and information on designation of the spindle, commanded rotational velocity and direction is stored in a case of a velocity control mode, and information on designation of the spindle, commanded rotational position and velocity is stored in a case of a position control mode. When a command to cancel the control of spindle is read, the control of the designated spindle and also the stored information on the control status of the spindle are transferred to the other control system. A command to acquire the control of the spindle is read in a machining program for the other control system, the control of the designated spindle is started by the other control system according to the transferred control status of the spindle.

5 Claims, 3 Drawing Sheets

FIG. 2

PROGRAM FOR SYSTEM #1

⋮
N1000 S100 P1 M03;
N1010 G01 Z100. F10.;
⋮
N1100 M100 P2 K1;
N1110 G01 Z200. F20.;
N1200 M50 P1;
N1210 P1 C150. F500.;
⋮
N1300 M100 P1 K0;
⋮
N1400 S500 P2 M03;
N1410 G01 Z35. F15.;
⋮
N1500 M100 P2 K0;
⋮

PROGRAM FOR SYSTEM #2

⋮
N2000 S600 P2 M04;
N2010 G01 Z-50. F5.;
⋮
←── SPINDLE #2 ──
(IN VELOCITY CONTROL MODE)
N2100 M100 P2 K0;
⋮

── SPINDLE #1 ──→
(IN POSITION CONTROL MODE)
N2300 M100 P1 K1;
N2310 P1 C-50.;
⋮

── SPINDLE #2 ──→
(IN VELOCITY CONTROL MODE)
N2500 M100 P2 K1;
⋮

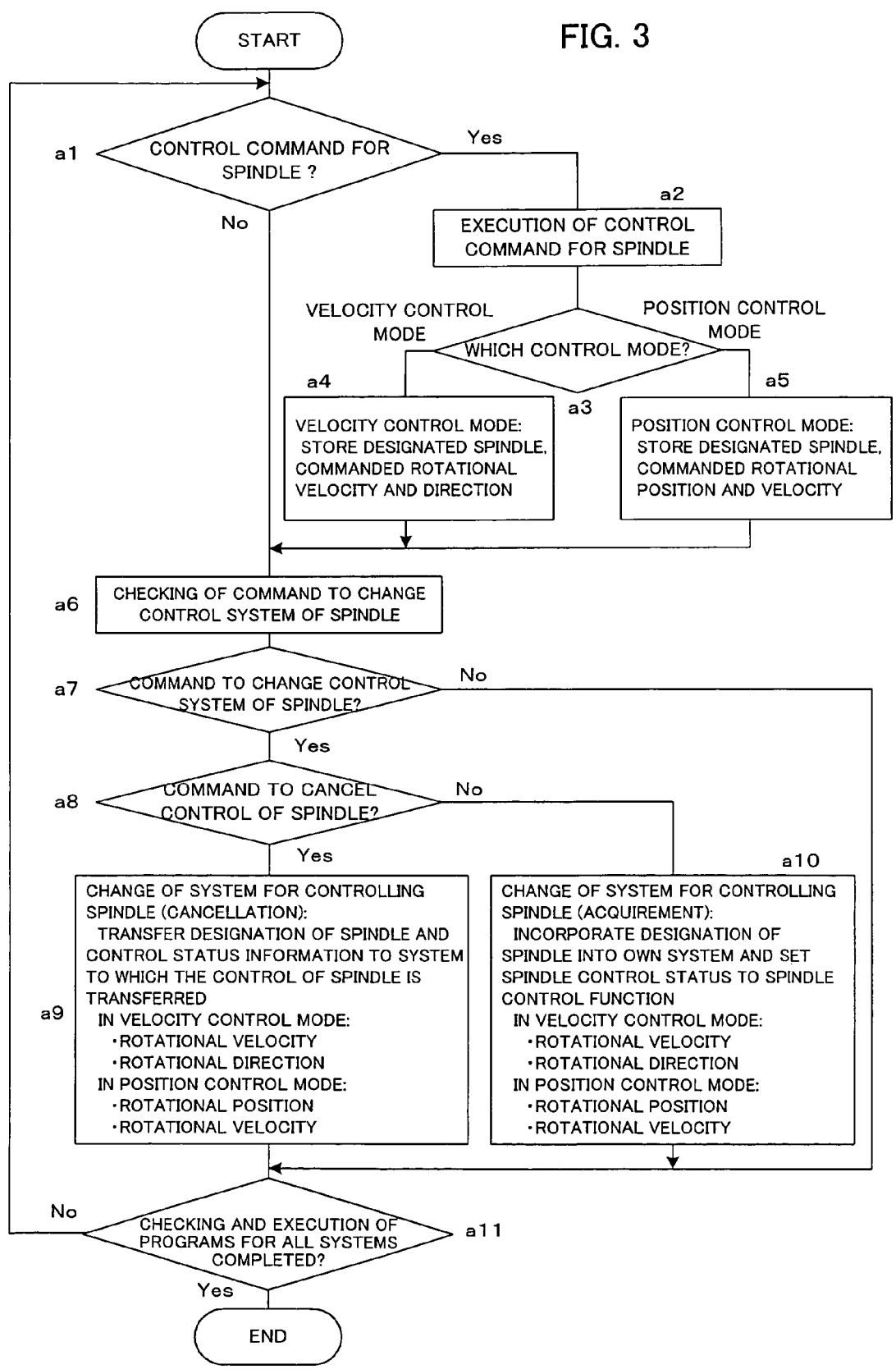

NUMERICAL CONTROLLER

BACKGROUND OF THE INVENTION

1. Field of the Invention

The present invention relates to a numerical controller for controlling a machine tool, and particularly to a numerical controller capable of performing a multi-system control.

2. Description of Related Art

There has been carried out that an industrial machine such as a machine tool is controlled by a numerical controller with a plurality of control systems independently from or synchronously with one another. In such control, there is a case where each control system has a spindle and a case where one spindle is controlled alternately by different control systems.

For example, in a case where a workpiece is attached to spindles respectively controlled to rotate in synchronism by different control systems, there possibly occurs a time delay in starting the spindles controlled by the respective control systems to cause a damage on the workpiece. So as to prevent this, there is proposed a numerical controller in which a machining program for one control system includes a spindle control command for the other control system, and command data for controlling the spindles are issued simultaneously to the one control system and the other control system based on the machining program for the one control system to eliminate the time delay in starting the spindles so as to operate the spindles simultaneously (see JP 3-71205A).

In the conventional numerical controller having a plurality of control systems, when control of a spindle by one control system is to be transferred to another control system, the transfer of the spindle control has to be performed in a state where the spindle is stopped. There is no problem in transferring the control of the spindle when the spindle is stopped, but in a case where the spindle is in rotation by one control system, it is required that the rotation of the spindle is decelerated to stop and then the control of the spindle is transferred to the other control system. Thus, there arises a problem of taking a considerable time for transferring of the control of the spindle.

SUMMARY OF THE INVENTION

The present invention provides a numerical controller capable of transferring control of a spindle from one control system to another control system in a short time.

A numerical controller of the present invention has a multi-system control function and comprises: a plurality of control systems for controlling at least one spindle; and means for transferring information on control status of the spindle by one control system from the one system to another system when the controlling of the spindle is to be transferred from the one control system to said another control system, wherein said another control system starts the control of the spindle with the control status of the spindle by the one control system maintained.

The information on the control status of the spindle may include information on which of a position control mode or a velocity control mode the spindle is controlled in.

The information on the control status of the spindle may include information on a rotational position and a rotational velocity of the spindle when the spindle is controlled in the position control mode.

The information on the control status of the spindle may include information on a rotational velocity and a rotational direction of the spindle when the spindle is controlled in the velocity control mode.

The spindle of which the control is to be transferred may be designated by a command in a machining program.

With the above configuration, controlling of a spindle can be transferred from one control system to another control system without stopping the spindle in rotation. Since it is not required to decelerate and stop the spindle in rotation in transferring the control of the spindle, the control system for controlling the spindle can be switched in a short time without taking redundant procedure.

BRIEF DESCRIPTION OF THE DRAWINGS

FIG. 2 is a diagram showing an example of machining programs with explanation according to the embodiment; and FIG. 3 is a flowchart of processing for switching a control system for controlling a spindle according to the embodiment.

DETAILED DESCRIPTION

Figure 1:
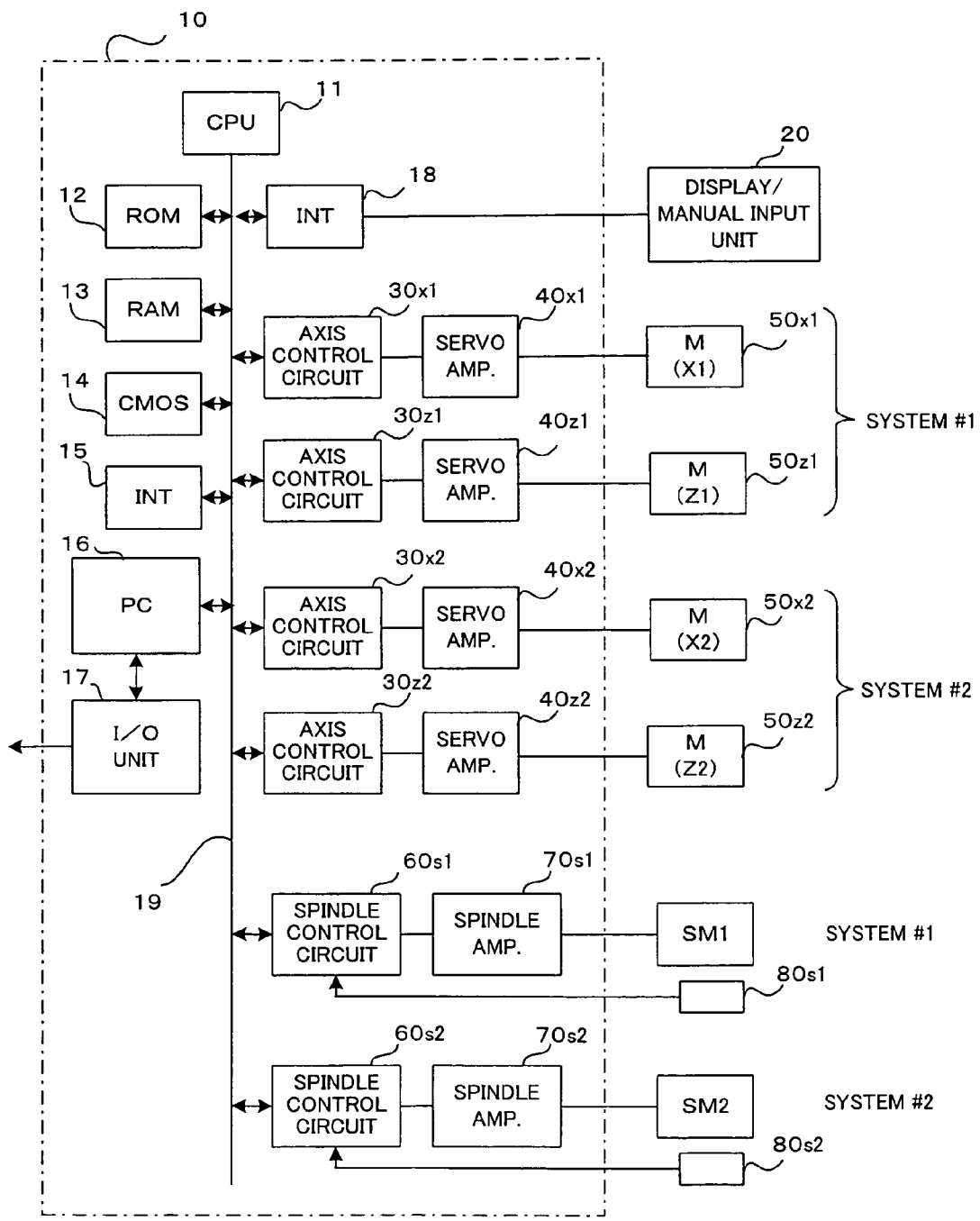
FIG. 1 is a block diagram of principal parts of a numerical controller according to an embodiment of the present invention.

FIG. 1 shows principal parts of a numerical controller 10 in the form of a block diagram according to one embodiment of the present invention. A CPU 11 is a processor for generally controlling the numerical controller 10. The CPU 11 reads a system program stored in a ROM 12 through a bus 19 and controls the numerical controller according to the system program. A RAM 13 stores temporary calculation data, display data, and various kinds of data inputted by an operator through a display/MDI unit 20 which comprises a display such as a CRT and a LCD, and a keyboard. A CMOS memory 14 is backed up with a battery, not shown, and is formed as nonvolatile memory which retains a storage state even if power supply to the numerical controller 10 is switched off. Stored in the CMOS memory 14 are machining programs for control systems #1 and #2 that are read through an interface 15 or inputted through the display/MDI unit 70. Further, an editor program for creating and editing a machining program and other application programs are stored in the ROM 12.

The interface 15 enables connection between the numerical controller 10 and an external device. A PC (programmable controller) 16 outputs a signal through an I/O unit 17 to an auxiliary device (e.g., an actuator such as a robot hand of a tool changer) of the machine tool to be controlled according to a sequence program stored in the numerical controller 10. The PC 16 also receives signals of various switches of an operation panel provided on a casing of the machine tool, and transmits the signals to the CPU 11 after performing necessary signal processing.

In this embodiment, the numerical controller 10 has control systems #1 and #2. Axis control circuits $30x1$, $30z1$, $30x2$, $30z2$ for respective axes receive motion command amounts for respective axes from the CPU 11 to output commands of respective axes to servo amplifiers $40x1$, $40z1$, $40x2$, $40z2$. Upon receipt of the commands, the servo amplifiers $40x1$, $40z1$, $40x2$, $40z2$ drive the servomotors $50x1$, $50z1$, $50x2$, $50z2$ of the respective axes of the machine tool. Each of the servomotors $50x1$, $50z1$, $50x2$, $50z2$ for respective axes includes a position/velocity detector, feedbacks a position/velocity feedback signal from the position/velocity detector to the associated one of the axis control circuits $30x1$, $30z1$, $30x2$, $30z2$, and performs position/velocity feedback control. In FIG. 1, the position/velocity feedback is omitted.

Spindle control circuits $60s$, $60s2$ receive spindle rotation commands and output spindle velocity signals to spindle amplifiers 70s1, 70s2, respectively. The spindle amplifiers 70s1, 70s2 receive the spindle velocity signals and rotate the spindle motors SM1, SM2 at the designated velocities. The position encoder 80s1, 80s2 output feedback pulses to the spindle control circuits 60s1, 60s2 in synchronization with the rotation of the spindle, to thereby perform velocity control. When the control mode is switched to the spindle position (C-axis) control mode, the spindle control circuits 60s1, 60s2 control the positions of the spindles based on the commanded rotational position and one-rotation signals and the feedback pulses, to thereby control the rotational position of the spindle.

In this embodiment, the control system #1 comprises the servomotors 50x1, 50z1 for driving X-axis and Z-axis of the system #1, the axes control circuits 30x1, 30z1, the servo amplifiers 40x1, 40z1, the spindle motor SM1, the spindle control circuit 60s1, the spindle amplifier 70s1 and the position encoder 80s1. Similarly, the control system #2 comprises the servomotors 50x2, 50z2 for driving X-axis and Z-axis of the system #2, the axes control circuits 30x2, 30z2, the spindle motor SM2, the spindle control circuit 60s2, the spindle amplifier 70s2 and the position encoder 80s2.

In the above hardware configuration of the numerical controller is the same as that of the conventional numerical controller having two control systems. The numerical controller of the present invention differs from the conventional one in the control when the control of the spindle is transferred from one control system to another control system.

FIG. 2 shows an example of machining programs according to the embodiment. A machining program for the control system #1 and a machining program for the control system #2 are prepared and stored in the CMOS memory 14. The CPU 11 reads out the programs block by block to be executed.

In the programs shown in FIG. 2, "N" with a subsequent numeral indicates a sequence number of the program. "S" with a subsequent numeral indicates a velocity command for the spindle, and "P" with a subsequent numeral indicates designation of the spindle. Specifically, "P1" designates a spindle #1 initially included in the system #1 and P2 designates a spindle #2 initially included in the system #2. M03 indicates a spindle rotation command in the forward direction (clockwise direction), M04 indicates a spindle rotation command in the reverse direction (counter-clockwise direction), G01 indicates a straight-line interpolation command (for cutting feed), "Z" with a subsequent numeral indicates a Z-axis position command, "F" with a subsequent numeral indicates a velocity command for the feed axis (X-axis, Z-axis), M100 indicates a waiting code, K0 indicates a code to cancel the spindle control, K1 indicates a code to start the spindle control, M50 indicates a command to switch the control mode of the spindle to the position control mode, and C with a subsequent numeral indicates a code to command a rotational position of the spindle.

In the program for the system #1, at the sequence number N1000, a command block to rotate the spindle #1 (P1) at velocity of 100 r.p.m. (S100) in the forward direction (M03) is programmed, and at the sequence number N1010, a command block to move the Z-axis of the system #1 to a position of 100 mm at velocity of 10 mm per one revolution of the spindle is programmed. In the meantime, in the program for the system #2, at the sequence number N2000, a command block to rotate the spindle #2 (P2) at 600 r.p.m. in the reverse direction (M04) is read, and at the sequence number N2010, a command block to move the Z-axis in the system #2 to a position –50 mm at velocity of 10 mm per one revolution of the spindle is issued. The control modes of the both systems #1 and #2 are initially set to the velocity control modes.

According to the command block "N1100 M100 P2 K1;" in the program for the system #1, the waiting between the control systems (M100) is performed in the system #1. Specifically, the control system #1 is commanded to wait until the waiting the code M 100 is also read in the system #2 and then start the control of the spindle #2 (P2). On the other hand, according to the command block "N2100 M100 P2 K0;" in the program for the system #2, the control system #2 is commanded to performed the waiting between the systems (M100) and then cancel the control of the spindle #2 (P2). As a result, the control of spindle #2 is transferred to the control system #1. At the transfer, information on the control status of the spindle #2 is also transferred to the system #1. In this example, the control status information of 600 r.p.m. (S600) and the reverse direction of rotation (M04) of the spindle #2 is transferred to the system #1. In the system #1, the control of the spindle #2 is started in accordance with the transferred information on the control status of the spindle #2 (600 r.p.m. in the reverse direction). As a result, the spindle #1 and also the spindle #2 are controlled by the system #1. Thus, the control of the spindle #2 is transferred to the system #1 with the control status thereof retained, to shorten the time required for the transfer of the control of the spindle between the control systems.

Then, at the sequence number "N1200", the command "M50 P1" is read so that the control mode of the spindle #1 is switched to the position control mode. At the sequence number "N1210", the command "P1 C150. F500" is read so that the spindle #1 is move to the rotational position of 150 degree at the rotational velocity of 500 deg/min. At the sequence number "N1300", the command "M100 P1 K0" is read so that the waiting between the systems is performed and then the control of the spindle #1 is cancelled (K0). On the other hand, at the sequence number "N2300" in the program for the system #2, the command "M100 P1 K1" is read so that the waiting between the systems is performed and then the control of the spindle #1 is started. At this time, information on the control status of the spindle #1, i.e., the rotational position of 150 degree (C150) and the rotational velocity of 500 degree/min (F500) is transferred from the control system #1 to the system #2. Then, at the sequence number "N2300", the command "P1 C-50." is read so that the spindle #1 is rotated to the rotational position of –50 degree by the system #2.

Meanwhile, the control system #1 maintains the control of the spindle #2 as shown in the sequence number "N1400". According to the command "M100 P2 K0" at the sequence number "N1500", the waiting between the systems is performed and then the control of the spindle #2 by the system #1 is cancelled. According to the command "M100 P2 K1" at the sequence number "N2500" of the system #2, the waiting between the systems is performed and the system #2 starts the control of the spindle #2. At this time, the control status information ("S500 P2 M03" at "N1400") of the spindle #2 is transferred from the system #1 to the system #2 so that the spindle #2 is drivingly controlled at 500 r.p.m. at the forward direction by the control system #2.

FIG. 3 is a flowchart showing the processing for switching the control system for controlling the spindle, to be performed by the CPU 11. The CPU 11 reads the machining programs for the control systems block by block and determines whether or not there is a control command for the spindle (Step a1). Specifically, it is determined whether or not a code "S" of a spindle velocity command or a code "C" of a rotational position command for the spindle (P1, P2) is included in the read block. If the read block does not include the control command for the spindle, the procedure proceeds to Step a6. If the read block includes the control command for the spindle, the commanded process is performed for the spindle designated by the P code in the command (Step a2). For instance, when the command block "S100 P1 M03;" is read at the sequence number "N1000" in the program for the system #1, the CPU 11 issues a command for rotating the spindle #1 at 100 rpm. in the forward direction to the spindle control circuit 60s1 of the system #1, and the spindle control circuit 60s1 controls the spindle servomotor SM1 for the spindle #1 at 100 rpm. in the forward direction.

Then, it is determined whether the present control mode of the designated spindle is the velocity control mode or the position control mode (it is determined to be the velocity control mode if the commanded code is S-code and it is determined to be the position control mode if the commanded code is C-code) (Step a3). If the control mode is determined as the velocity control mode, information of the designated spindle, the commanded rotational velocity and the commanded rotational direction is stored (Step a4). If the control mode is determined as the position control mode, the information of the designated spindle (P1, P2) and the commanded rotational position and the commanded rotational velocity is stored (Step a5), and the procedure proceeds to Step a6.

In Step a6, it is determined whether or not the read block includes a command of changing the control system of the designated spindle. Specifically, it is determined whether there is a command "K0" or "K1" in the read block (Step a7). If there is not such command, the procedure proceeds to Step a11. When it is determined that there is such command, it is determined whether the command is for the cancellation (K0) or the acquirement (K1) of the spindle control (Step a8) and if it is for the cancellation of the spindle control, the waiting of the control systems is performed (the codes K0, K1 of cancellation, acquirement of spindle control are commanded with the waiting code M100), and the control of the spindle (P1, P2) to be cancelled in the control system is transferred to the control system which is commanded to start the control of the spindle. At this time, the present status of the control of the designated spindle which has been stored at Step a4 or a5 is transferred to the control system which is commanded to start the control of the designated spindle. Specifically, in the case where the spindle is controlled in the velocity control mode, the information on the commanded rotational velocity and rotational direction of the spindle is transferred, and in the case where the spindle is controlled in the position control mode, the information on the commanded rotational velocity and the rotational position is transferred (Step a9), and the procedure proceeds to Step a11.

On the other hand, it is determined that not the command (K0) to cancel the control of spindle but the command (K1) to start control of spindle is programmed in Step a8, the waiting of the control systems is performed and then the designation of the spindle (P1, P2) programmed with the command (K1) is incorporated from the control system which cancels the control of the designated spindle. At that time, the status of control of the designated spindle is received and set to the spindle control function. Thereafter, the control system starts the control of the spindle with the received control status (Step a10), and the procedure proceeds to Step a11.

In the example of programs as shown in FIG. 2, when the command "M100 P2 K1" is read at the sequence number "N1100" of the program for the control system #1, after waiting until the code "M100" in the command "M100 P2 K1" is read at the sequence number "N2100" of the program for the control system #2, the control of the spindle #2 is transferred from the control system #2 to the control system #1 and also the control status of the spindle #2 at the time of the transferring, i.e. the information of 600 r.p.m. in the forward direction is transferred to the control system #1.

In Step a11, it is determined whether or not checking and execution of the spindle control is completed in the programs for all the control systems, and if not, the procedure returns to Step a1 to start the above-described processing.

What is claimed is:

1. A numerical controller having a multi-system control function, comprising:
    a plurality of control systems for controlling at least one spindle; and
    means for transferring information about control status of the spindle from one control system to another control system based on a command indicating that the controlling of the spindle is to be transferred from said one control system to said another control system,
    wherein said another control system starts the control of the spindle with the control status of the spindle by said one control system maintained.

2. A numerical controller according to claim 1, wherein the information on the control status of the spindle includes information on which of a position control mode or a velocity control mode the spindle is controlled in.

3. A numerical controller according to claim 2, wherein the information on the control status of the spindle includes information on a rotational position and a rotational velocity of the spindle when the spindle is controlled in the position control mode.

4. A numerical controller according to claim 2, wherein the information on the control status of the spindle includes information on a rotational velocity and a rotational direction of the spindle when the spindle is controlled in the velocity control mode.

5. A numerical controller according to claim 1, wherein the spindle of which the control is to be transferred is designated by a command in a machining program.

* * * * *